(12) United States Patent
Doi

(10) Patent No.: US 7,532,395 B2
(45) Date of Patent: May 12, 2009

(54) LENS SHEET FOR SCREEN

(75) Inventor: Yasuhiro Doi, Osaka (JP)

(73) Assignee: Dai Nippon Printing Co., Ltd., Tokyo-To (JP)

(*) Notice: Subject to any disclaimer, the term of this patent is extended or adjusted under 35 U.S.C. 154(b) by 422 days.

(21) Appl. No.: 10/566,523

(22) PCT Filed: Jul. 29, 2004

(86) PCT No.: PCT/JP2004/010838
§ 371 (c)(1),
(2), (4) Date: Jan. 30, 2006

(87) PCT Pub. No.: WO2005/013000
PCT Pub. Date: Feb. 10, 2005

(65) Prior Publication Data
US 2006/0187545 A1    Aug. 24, 2006

(30) Foreign Application Priority Data
Jul. 31, 2003    (JP) .................... 2003-284308

(51) Int. Cl.
*G03B 21/56* (2006.01)
(52) U.S. Cl. ................... 359/443; 428/515
(58) Field of Classification Search .......... 359/443, 359/460, 457; 428/515
See application file for complete search history.

(56) References Cited

U.S. PATENT DOCUMENTS

| | | | |
|---|---|---|---|
| 6,088,158 A | | 7/2000 | Kimura |
| 6,650,471 B2* | | 11/2003 | Doi .................... 359/443 |
| 6,836,363 B2* | | 12/2004 | Goto et al. ............. 359/460 |
| 6,927,257 B2* | | 8/2005 | Akada et al. ........... 525/207 |
| 7,345,821 B2* | | 3/2008 | Miyao ................. 359/620 |
| 2003/0081311 A1 | | 5/2003 | Doi |

FOREIGN PATENT DOCUMENTS

| JP | 11-072848 A1 | 3/1999 |
|---|---|---|
| JP | 2000-047329 A1 | 2/2000 |
| JP | 2000-066307 A1 | 3/2000 |
| JP | 2001-228549 A1 | 8/2001 |
| JP | 2003-084101 A1 | 3/2003 |

\* cited by examiner

*Primary Examiner*—Christopher Mahoney
(74) *Attorney, Agent, or Firm*—Burr & Brown

(57) ABSTRACT

There are provided a lens sheet for a screen, which is highly stable by virtue of a reduced tendency toward warping, lifting and the like of the lens caused by external humidity and, at the same time, has a suppressed tendency toward friction between lenses during transport as a screen, and a resin composition for constituting the lens sheet. The lens sheet is used in combination with other lens sheet and comprises one or at least two layers. When the layer in contact with the above other lens is formed of a thermoplastic resin, the universal hardness of the thermoplastic resin composition is brought to a range of 31.0 to 42.0 N/mm$^2$.

9 Claims, 3 Drawing Sheets

LENS SHEET FOR SCREEN

TECHNICAL FIELD

This invention relates to a lens sheet for screen, comprising a thermoplastic resin. More particularly, the present invention relates to a lens sheet which has a reduced tendency toward waving and warpage of lens caused by moisture absorption and, at the same time, has excellent friction resistance.

BACKGROUND OF THE INVENTION

In projection screens, in general, a Fresnel lens is used in combination with a lenticular lens. In order to maximally develop the optical effect, in use, the Fresnel lens and the lenticular lens are disposed so as to face each other and are brought into intimate contact with each other. The Fresnel lens functions to collimate projected light for correction in such a manner that the light is perpendicular to the screen face. On the other hand, the lenticular lens functions to diffuse light collimated by Fresnel lens mainly in a horizontal direction. In general, in the above projection screen, in use, the light outgoing surface side of the Fresnel lens (circular Fresnel convex lens) and the light incident surface side of the lenticular lens are brought into intimate contact with each other.

When lens faces of optical elements are brought into intimate contact with each other, since the surface of both the lenses has convexes and concaves, the surface shapes affect mutual surface shapes. For example, in the above example, the section of the Fresnel lens surface has a concave-convex shape with a sharp front edge like a cutting blade. On the other hand, the section of the lenticular lens surface is in a semicircular or semielliptic or other rounded protuberant arched concave-convex shape. When the Fresnel lens sheet and lenticular lens sheet having such respective sectional forms are brought into intimate contact with each other, the protuberant apex in the lenticular lens comes into contact with the sharp front edge in the Fresnel lens and the shape of the lenticular lens and/or the shape of the Fresnel lens, that is, the concave-convex shape on the lens surface, are deformed by contact pressure, resulting in lens collapse.

In these lens sheets, warpage is imparted to one lens sheet as for the lenticular lens and the Fresnel lens to come into intimate contact with each other, and both the lens sheets are brought to intimate contact with each other by taking advantage of the elasticity. In general, thermoplastic resins free from optical anisotropy are used as a polymeric resin material constituting the lenticular lens. Specifically, in order to improve impact resistance, a resin produced by copolymerizing butadiene rubber (BR) with polymethyl methacrylate (PMMA), polycarbonate (PC) or the like has been used. The thermoplastic resin with BR introduced thereinto sometimes causes warpage in the lens sheet due to moisture absorption of the resin or the like or causes defects such as waving or lenticulation of the lens due to a temperature change during extrusion.

In order to solve this problem, Japanese Patent Laid-Open Nos. 72848/1999 and 13388/2001 propose a lenticular lens comprising two materials, different from each other in coefficient of linear expansion or water absorption, which have been composited with each other. Japanese Patent Laid-Open No. 133886/2001 described above proposes such a construction that a multilayer construction is adopted in a lenticular lens sheet, and, in order to prevent the occurrence of local warp spots of the lens sheet, the addition amount of rubber particles in the layer (light incident side) which comes into contact with the Fresnel lens is reduced and the addition amount of rubber particles in the opposite side (light outgoing side) layer is increased. Further, Japanese Patent Laid-Open No. 72848/1999 proposes that a lenticular lens sheet having a multilayer construction is adopted and, in order to prevent the occurrence of lifting or warpage of the screen set attributable to a change in external humidity, PMMA or the like is used on the inner layer side (light incident side) of the lens sheet, while a polymethyl methacrylate-polystyrene copolymer having a low level of hygroscopicity is used on the outer layer side (light outgoing side).

In the construction described in Japanese Patent Laid-Open No. 133886/2001, in order to avoid vibration friction during transportation and the like, preferably, a larger amount of rubber particles are present on the surface of contact with the Fresnel lens. Even when the addition amount of rubber is increased, the friction resistance of the lens cannot be improved.

Further, in general, a resin which has been copolymerized with BR for enhancing the impact resistance of the lens is used. Accordingly, in the lens sheet described in Japanese Patent Laid-Open No. 72848/1999, when the content of BR is high, the hygroscopicity of the light incident side lens material becomes disadvantageously high and, consequently, the warpage level of the lens sheet per se is increased. In order to suppress the warpage of the lens caused by moisture absorption, the content of polystyrene (PS) should be increased to some extent. When the content of PS in the light incident side lens layer is enhanced, the impact resistance and friction resistance of the lens are disadvantageously deteriorated.

Further, in recent years, the development of a Fresnel lens formed of an ultraviolet curing resin which can be shaped into a high-definition lens form has been forwarded. When a lenticular lens formed of a thermoplastic resin is used in combination with a Fresnel lens formed of this ultraviolet curing resin, deformation or collapse of the lens caused by static contact force (i.e., pressure of contact between lenses) can be suppressed. However, the resistance to friction of the lenticular lens caused by dynamic contact force (i.e., dynamic contract friction of the lens caused during lens sheet transportation) is unsatisfactory.

Specifically, in an ultraviolet curing resin having a dense network structure in the polymer chain, the friction of lens by dynamic contact force can be suppressed by regulating the modulus of elasticity of the resin. In a thermoplastic resin constituted by entanglement of a polymer chain, in order to improve the friction resistance of the lens, a material design should be carried out from a viewpoint different from the modulus of elasticity.

SUMMARY OF THE INVENTION

The present inventors have now found that the use of a thermoplastic resin having a modulus of elasticity and a creep deformation quantity in respective predetermined ranges in a lenticular lens can avoid lifting of a screen set caused due to its hygroscopicity and, at the same time, can reduce scratches of a light incident face of the lenticular lens by vibration during screen transportation. The present invention has been made based on such finding.

Accordingly, an object of the present invention is to provide a resin composition for constituting a screen lens sheet that, while avoiding lifting of a screen set caused by hygroscopicity, the occurrence of scratches of the light incident surface of the lenticular lens by vibration during screen transportation can be reduced.

According to the present invention, there is provided a lens sheet for a screen comprising one or at least two layers, adapted for use in combination with other lens sheet, the layer in contact with said other lens being formed of a thermoplastic resin, said thermoplastic resin having a universal hardness of 31.0 to 43.0 N/mm².

Preferably, the thermoplastic resin has a compression modulus of elasticity of 1600 to 2500 MPa and a maximum deformation quantity of 1.95 to 2.7 µm as measured by a creep test and more preferably has a loss tangent at −20° C. of not less than 0.04 and an elastic work ratio of not less than 70%.

The use of a thermoplastic resin having such property values can provide a screen lens sheet which has a reduced tendency toward warpage, lifting and the like of the lens sheet and thus is highly dimensionally stable and, at the same time, has a reduced tendency toward friction between lenses during transportation as a screen.

DETAILED DESCRIPTION OF THE INVENTION

Figure 1:
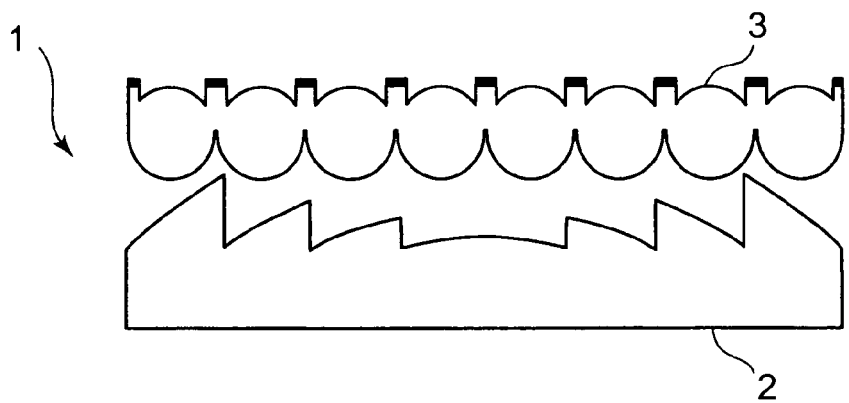
FIG. 1 is a schematic diagram showing one embodiment of a projection screen according to the present invention.
Figure 2:
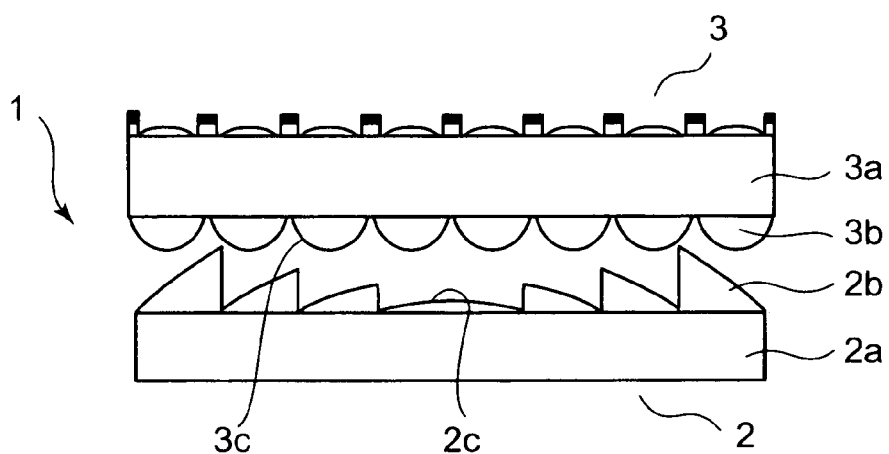
FIG. 2 is a schematic diagram showing another embodiment of a projection screen according to the present invention.

The lens sheet for a screen according to the present invention can be used as a lenticular lens 3 in a transmission projection screen 1 shown in FIG. 1. In the projection screen 1, a Fresnel lens element 2 and a lenticular lens element 3 are provided so as for the lens faces of these elements to face each other and are brought to intimate contact with each other. The lenticular lens element may have a single layer structure as shown in FIG. 1, or alternatively, as shown in FIG. 2, may have a multilayer structure comprising a lens 3b provided on the light incident side of a base material 3a. Further, as shown in FIG. 2, the lenticular lens element 3 may have small lenticular lenses, protrusions and black stripes on its side remote from the Fresnel lens element 2.

In using the lens sheet for a screen having a single layer structure or a multilayer structure in combination with other lens, for example, a Fresnel lens, when the lens sheet on its surface which comes into contact with the Fresnel lens is formed of a thermoplastic resin, the universal hardness of the thermoplastic resin is brought to 31.0 to 43.0 N/mm². Here the term "universal hardness" as used herein refers to hardness as measured by an indentation test specified in ISO 14577-2, and the universal hardness value refers to a value as measured with a microhardness meter according to measuring standards in this test. The universal hardness specified in ISO 14577-2 is a value determined by taking into consideration deformation upon application of external force to the material and restoration after the removal of external force and can more properly reflects the behavior of deformation and restoration regarding the material as compared with the conventional hardness measurement.

In the present invention, it was found that, when the universal hardness value of the material constituting the lenticular lens falls within a predetermined range, warpage, lifting and the like of the lens are reduced, and, at the same time, the friction resistance of the lens can be improved.

That is, in the present invention, in the case where the lenticular lens on its face which comes into contact with the Fresnel lens face (that is, light incident face of lens) is formed of a thermoplastic resin, the universal hardness of the thermoplastic resin composition is 31.0 to 43.0 N/mm². Preferably, the universal hardness of the thermoplastic resin composition is 32.0 to 42.0 N/mm², more preferably 36.0 to 41.0 N/mm². When the universal hardness of the lenticular lens formed of a thermoplastic resin falls within the above-defined range, in such a state that the lenticular lens element as a projection screen is in contact with a Fresnel lens, upon the application of vibration or impact to the screen, deformation of the lenses caused by friction between the lenses can be suppressed. Further, in the lens sheet according to the present invention, when the universal hardness falls within the above-defined range, deformation of the lens by friction between lenses can be suppressed in both the case where the Fresnel lens which comes into contact with the lenticular lens is formed of a thermoplastic resin and the case where the Fresnel lens is formed of an ultraviolet curing resin.

When the universal hardness of the thermoplastic resin is less than 31.0 N/mm², the proportion of the rubber component in the thermoplastic resin composition is increased. In this case, although the thermoplastic resin is soft and has increased impact resistance, but on the other hand, the hygroscopicity is so high that a problem of lifting and the like of the lens occurs. On the other hand, when the universal hardness exceeds more than 43.0 N/mm², the lens per se is excessively hard and, thus, the impact resistance of the lens is disadvantageously deteriorated. For this reason, the friction resistance is lowered and, further, handleability problems such as high susceptibility to cracking of the screen per se occur.

Further, in the present invention, it was found that the friction resistance of the lenticular lens can be improved by aiming at the impact resistance of the material constituting the lenticular lens. Specifically, although the universal hardness is a property value in which both the hardness component and deformation component of the material are taken into consideration, judgment on restrorability is difficult. For example, even when the universal hardness value is high, it is difficult to judge whether, since the percentage contribution of the hardness component is high and, at the same time, the percentage contribution of the deformation component is small, the restorability is low, or since the percentage contribution of the hardness component is small and, at the same time, the percentage contribution of the deformation component is large, the restorability is large. Thus, for some materials, even when only the universal hardness value falls within a proper range, in some cases, it is difficult to provide materials having optimal friction resistance. The present inventors have aimed at the compression modulus of elasticity and maximum deformation quantity of the material constituting the lens and have found that the use of a material, of which the above values fall within respective predetermined ranges, in lenticular lenses can improve the friction resistance of the lenticular lens.

In the present invention, when the lenticular lens in its face in contact with the Fresnel lens face (that is, light incident face of the lens) is formed of a thermoplastic resin, preferably, the compression modulus of elasticity of the thermoplastic resin is 1600 to 2500 MPa, more preferably 1600 to 2400 MPa, particularly preferably 1900 to 2370 MPa, and the maximum deformation quantity in the creep test is 1.95 to 2.70 μm, more preferably 2.02 to 2.44 μm, particularly preferably 2.05 to 2.44 μm. When the compression modulus of elasticity and maximum deformation quantity of the thermoplastic resin constituting the lenticular lens are specified to the above-defined respective ranges, the impact resistance of the lenticular lens and the friction resistance are improved. The reason why not only the compression modulus of elasticity but also the maximum deformation quantity is taken into consideration is considered as follows.

Since the compression modulus of elasticity specifies the quantity of deformation to external force within the elastic region, when a given or higher load is applied to the lens, deformation occurs beyond the elastic deformation region. Accordingly, creep deformation of the lens material should also be taken into consideration in the optimization of the lens material. The term "compression modulus of elasticity" as used herein refers to a value measured with a microhardness tester used in the universal hardness test. On the other hand, the term "maximum deformation quantity" refers to the maximum deformation quantity as determined in a creep test at the maximum load set with a microhardness meter in the universal hardness test.

When the compression modulus of elasticity of the thermoplastic resin constituting the lens sheet is less than 1600 MPa, the abrasion of the lens by the friction is reduced. In such a resin, however, the content of the butadiene rubber component is so high that the hygroscopicity and coefficient of thermal expansion (coefficient of linear expansion) are increased and, consequently, problems of warpage and lifting of the lens occur. On the other hand, when the compression modulus of elasticity of the thermoplastic resin exceeds 2500 MPa, the content of styrene or the like is increased, resulting in lowered impact resistance and friction resistance. Further, when the maximum deformation quantity of the thermoplastic resin constituting the lens sheet is less than 1.95 μm, the impact resistance of the lens sheet is lowered and the friction resistance is deteriorated. On the other hand, when the maximum deformation quantity exceeds 2.70 μm, although the friction resistance of the lens sheet is improved, in the thermoplastic resin having the above maximum deformation quantity, the content of the butadiene rubber component is increased, leading to increased hygroscopicity and coefficient of thermal expansion (coefficient of linear expansion) which pose a problem of warpage or lifting of the lens.

In the present invention, for example, when a methyl methacrylate-styrene-butadiene rubber copolymer is used as the thermoplastic resin, optimization of the mixing ratio of monomers so as for the compression modulus of elasticity and maximum deformation quantity of the polymer to fall within the above respective ranges can provide lenticular lens materials which can realize both supression of waving, lifting and warpage of the lens sheet and resistance to friction. In the above copolymer, preferably, the content of methyl methacrylate and styrene is not less than 20% by weight based on the copolymer.

When the above thermoplastic resin comprising a copolymer is used in the lens sheet having a single-layer structure, the water absorption of the thermoplastic resin is preferably not more than 0.2%, more preferably not more than 0.18%. The use of the thermoplastic resin having low water absorption can suppress the warpage of the screen lens sheet even when the screen lens sheet is placed under high-temperature and high-humidity conditions. Further, in order to suppress the warpage of the lens sheet, the pressure of contact with the Fresnel lens can be kept constant and, thus, the collapse and friction of the lens can be avoided.

When the lens sheet for a screen according to the present invention comprises two or more layers, more preferably, the lens sheet satisfies a relationship represented by $\alpha_1 - \alpha_2 > 0.1\%$ wherein $\alpha_1$ represents the water absorption of the thermoplastic resin constituting the layer on the side (light incident side) in contact with a Fresnel lens, %; and $\alpha_2$ represents the water absorption of the resin constituting the layer(s) other than the layer in contact with said other lens, %. Thus, when the water absorption of the layer on its side in contact with the Fresnel lens is rendered higher than the water absorption of the other layer(s), the screen lens sheet, even when placed under high-temperature and high-humidity conditions, can maintain a predetermined level of warpage imparted in the production of the lens sheet.

In the above preferred embodiment, when the lens sheet for a screen according to the present invention has a three-layer structure, preferably, the lens sheet satisfies a relationship represented by formula $\alpha_1 > \alpha_2$ and $\alpha_1 > \alpha_3$, more preferably $\alpha_1 > \alpha_2 > \alpha_3$, wherein $\alpha_1$, $\alpha_2$, and $\alpha_3$ represent water absorption values of respective layers as viewed from the side (light incident side) in contact with the Fresnel lens sheet, that is, $\alpha_1$ represents the water absorption of the layer in contact with the Fresnel lens and $\alpha_3$ represents the water absorption of the layer most remote from the Fresnel lens. The term "water absorption" as used herein refers to a value as measured according to JIS K 7209.

Further, preferably, the thermoplastic resin constituting the lens sheet has a loss tangent at −20° C. of not less than 0.04, particularly not less than 0.048, and an elastic work ratio of not less than 70%, particularly not less than 77%. When a lenticular lens is prepared using a thermoplastic resin having such material property values, even when vibration is applied in such a state that the lens sheet is in contact with the Fresnel lens sheet, there is no fear of causing abrasion of the surface of the lenticular lens by friction of the surface by the Fresnel lens. The term "loss tangent" as used herein refers to a value as measured by temperature dispersion of dynamic viscoelasticity under 10 Hz, that is, under assumed transportation vibration conditions. On the other hand, the term "elastic work ratio" as used herein refers to the ratio of elastic deformation energy to total load energy.

The loss tangent (tan δ) is one parameter which represents vibration damping properties with respect to the possible level of damping of impact external force (for example, vibration during transportation of lens sheet) applied to the material. The elastic work ratio is one parameter which represents deformation restorability, i.e., the possible level of restoration of the deformation (lens collapse) of the material caused by impact external force. It was found that, when a thermoplastic resin in which these two parameters fall within the above respective ranges is used in the lens sheet, the friction resistance of the lens can be improved. Specifically, when the loss tangent at −20° C. of the thermoplastic resin constituting the lens sheet is less than 0.04, the vibration-proof properties of the lens are unsatisfactory, while, on the other hand, when the elastic work ratio is less than 70%, the impact resistance of the lens is lowered and, consequently, the friction resistance of the lens is also lowered.

The thermoplastic resin used in the lens sheet according to the present invention is not particularly limited, and examples thereof include clear resins such as acrylic resins, PCs, PSs or the like (MS or AS resins), polyester resins, cyclic olefin copolymers, and cycloolefin polymers. Polymethyl methacrylate (PMMA) is particularly preferred. Further, in order to improve the impact resistance of the lens, methyl methacrylate may be copolymerized with butadiene rubber (BR).

Further, in order to suppress the warpage and lifting of the lens caused by moisture absorption, methyl methacrylate may be copolymerized with PS or the like. Further, a construction may also be adopted in which the layer in contact with the Fresnel lens face is formed of a BR-rich copolymer and the layer on the opposite side (external side) is formed of a PS-rich copolymer. When the lenticular lens has the above multi-layer structure, the warpage and lifting of lenses caused by the impact resistance and moisture absorption of the lens can be suppressed. Even when a thermoplastic resin comprising the above copolymer is used, the layer in the lenticular lens on its side (light incident face) in contact with the Fresnel lens should have a universal hardness in the above-defined range.

In the thermoplastic resin, in order to improve the slipperiness of the lens, slip agents such as polydimethylsiloxane or fluorine may be internally added. Further, in order to provide the above numerical ranges, the entanglement density of the polymer chain should be regulated, for example, by the number of polar groups, molecular weight, and molecular weight distribution of the polymer constituting the thermoplastic resin.

Further, other resins, for example, noncrosslinking polyester-type polyurethanes, polycarbonates, copolymers of methyl methacrylate and styrene, acrylic polymers, bisphenol A-type and bisphenol F-type epoxy resins, olefin resins, and thermoplastic olefin elastomers may be mixed in such an amount that falls within the scope of the present invention.

If necessary, a diluent may be used. Examples of diluents include organic solvents such as acetone, ethanol, methanol, ethyl acetate, tetrahydrofuran, cyclohexane, diethyl ether, methyl ethyl ketone, toluene, and benzene.

Further, for example, ultraviolet absorbing agents, photostabilizers, surfactants, antifoaming agents, antistatic agents, antioxidants, and flame retardants may be added to the thermoplastic resin used in the lens sheet according to the present invention in such an amount that does not adversely affect the properties of the molded lens.

A process for producing the lens sheet for a screen according to the present invention using the above resin will be described.

In the production of the lens sheet according to the present invention using the above-described thermoplastic resin, the lens sheet may be produced in an integral structure, i.e., a single layer structure form. This structure can be produced by pressing or casting.

On the other hand, a lens sheet having a structure of two or more layers may be produced by either a lamination process in which the individual layers are extruded through dies and are then adhered to each other and are further molded, or a coextrusion process in which, before extrusion through dies, the layers are put on top of each other and the stacked assembly is extruded. In the lamination process, a method may also be adopted in which at least one layer is previously formed in a film form followed by adhering to another layer and molding.

EXAMPLES

The following Examples further illustrate the lens sheet for a screen according to the present invention. However, it is needless to say that the present invention is not limited to the Examples.

1. Preparation of Lenticular Lenses

Lenticular lenses having a single layer structure and lenticular lenses having a double layer structure were prepared using resins different from each other in a coefficient of linear expansion and water absorption. The resins used are summarized in Table 1.

Here the lens sheets in Examples 1 to 6 and Comparative Examples 1 to 3 were prepared by extrusion using thermoplastic resins. In the lens sheets having a two layer structure, thermoplastic resins shown in Table 1 were used for the layer in the lens sheet on its side (light incident surface side) in contact with a Fresnel lens, while a blend resin composed of a methyl methacrylate-styrene copolymer, BR and PMMA (HT 013, manufactured by Sumitomo Chemical Co., Ltd.) was used for the layer on the opposite side (light outgoing surface side).

Separately, a test Fresnel lens was prepared for use in evaluation of friction resistance of lenticular lenses and the like. The test Fresnel lens was prepared using an ultraviolet curable resin comprising an epoxy acrylate oligomer. The lenticular lens had the following various properties. Specifically, when the maximum load was brought to 20 mN with an ultramicrohardness meter, the measured property values were as follows: compression modulus of elasticity 1240 MPa, universal hardness 13.1 N/mm$^2$, maximum deformation quantity 1.75 µm, and elastic work ratio 44%. In the Examples, the test Fresnel lens used was formed of an ultraviolet cured resin. Even when the test Fresnel lens is formed of a thermoplastic resin, however, evaluation results are not affected by this.

Samples for measurement of dynamic viscoelasticity which will be described later were prepared by preparing a sheet using each resin shown in Table 1 in such a form that any lens shape is not formed, and cutting the sheet into a strip form having a size of 30 mm×3 mm×1.8 mm.

TABLE 1

| | | Resin grade | Content of styrene, wt % | Coefficient of linear expansion | Water absorption, % | Difference in water absorption between inner layer and outer layer |
|---|---|---|---|---|---|---|
| Ex. 1 | Single | HT 013 | 25 | 8 × 10$^{-5}$ | 0.2 | — |
| Ex. 2 | layer | HW | 30 | 8 × 10$^{-5}$ | 0.2 | |
| Ex. 3 | structure | SF 10G | 40 | 8 × 10$^{-5}$ | 0.18 | |
| Ex. 4 | Multilayer structure | 1:1 blend of MH/HT 55X | 12 | 8 × 10$^{-5}$ | 0.3 | 0.1 |
| Ex. 5 | | 1:1 blend of MI-7/V 826 | 13 | — | 0.3 | 0.1 |
| Comp. Ex. 1 | Single | MH | 15 | 6 × 10$^{-5}$ | 0.3 | — |
| Comp. Ex. 2 | layer | HT 55X | 10 | 8 × 10$^{-5}$ | 0.4 | |
| Comp. Ex. 3 | structure | V 826 | 15 | — | 0.4 | |
| Comp. Ex. 4 | | MI-7 | 11 | — | 0.3 | |

TABLE 1-continued

|  | Resin grade | Content of styrene, wt % | Coefficient of linear expansion | Water absorption, % | Difference in water absorption between inner layer and outer layer |
|---|---|---|---|---|---|
| Comp. Ex. 5 |  | DR | 10 | — | 0.4 |  |
| Comp. Ex. 6 |  | HFI 10 | 10 | — | 0.4 |  |
| Comp. Ex. 7 | Multilayer structure | 2:1 blend of MH/HT 55X | 14 | $8 \times 10^{-5}$ | 0.3 | 0.1 |

In the table,
HT 013: blend of MMA-styrene copolymer/BR/PMMA (manufactured by Sumitomo Chemical Co., Ltd.),
HW: styrene-diene rubber copolymer/styrene-MMA copolymer (manufactured by Sumitomo Chemical Co., Ltd.),
SX-100: MMA-styrene copolymer/rubber modified styrene resin/rubber-like elastomer fine particles (manufactured by Asahi Kasei Corporation),
SF 10G: MMA-styrene copolymer/rubber modified styrene resin/rubber-like elastomer fine particles (manufactured by Asahi Kasei Corporation),
MH: PMMA (manufactured by Sumitomo Chemical Co., Ltd.),
HT 55X: acrylic rubber/acrylic resin (manufactured by Sumitomo Chemical Co., Ltd.),
V826: manufactured by Elf Atochem,
MI-7: manufactured by Elf Atochem,
DR: manufactured by Elf Atochem, and
HFI 10: manufactured by Elf Atochem.

The samples thus obtained were measured for universal hardness (hereinafter often abbreviated to "UH"), compression modulus of elasticity, maximum deformation quantity, coefficient of linear expansion, water absorption, Izod impact strength, and loss tangent.

A TV set collapse test and a vibration test at each temperature were carried out for the evaluation of the lens sheets.

For the test Fresnel lens, UH, compression modulus of elasticity, and maximum deformation amount were measured in the same manner as described above.

Methods for these tests will be described.

2. Measurement of Universal Hardness

For each of the lens sheets, the universal hardness was measured with an ultramicrohardness meter (H-100V, manufactured by Fischer). A ball indenter of tungsten carbide (WC) having a diameter of 0.4 mm was used as the indenter.

3. Measurement of Compression Modulus of Elasticity

A universal hardness test with an ultramicrohardness meter (H-100V, manufactured by Fischer) was applied to calculate the compression modulus of elasticity. Specifically, the compression modulus of elasticity was determined by gradually increasing the load applied by the indenter until the load reached a predetermined value, then gradually reducing the load, preparing a curve for the dependency of penetration depth upon load based on the results, and analyzing the measurement results. A ball indenter of tungsten carbide (WC) having a diameter of 0.4 mm was used as the indenter.

Figure 3:
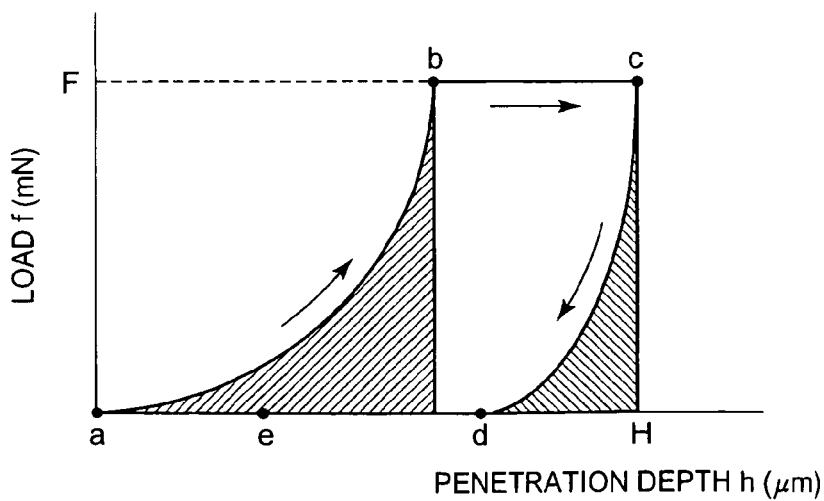
FIG. 3 is a schematic diagram illustrating a curve for the dependency of penetration depth upon load.

The curve for the dependency of penetration depth upon load is typically as shown in FIG. 3. At the outset, when load f is gradually increased from 0 (point a), deformation occurs and the penetration depth of the indenter increases gradually. When increasing the load is stopped at a certain load value, the penetration caused by plastic deformation is stopped (point b). Thereafter, when the load value is maintained at that value, during this period, the penetration depth continuously increases due to creep deformation and reaches point c at which maintaining the load value is terminated. Thereafter, when the load is gradually decreased, the penetration depth decreases toward point d due to elastic deformation.

In the above case, the maximum load value F as the load value at point b in FIG. 3 was set to 100 mN. The time for creep deformation was discretioarily 60 sec.

The procedure for preparing the curve for the dependency of the penetration depth upon load will be described.

(1) The load value for compression is increased from 0 to 100 mN in 100 steps every 0.1 sec.

(2) The load value 100 mN was maintained for 60 sec to cause creep deformation.

(3) The load value is decreased to 0.4 mN (the minimum load in the tester) in 40 steps every 0.1 sec.

(4) The load value 0.4 mN was maintained for 60 sec to recover the penetration depth.

(5) The procedure of (1) to (4) was repeated three times.

Figure 4:
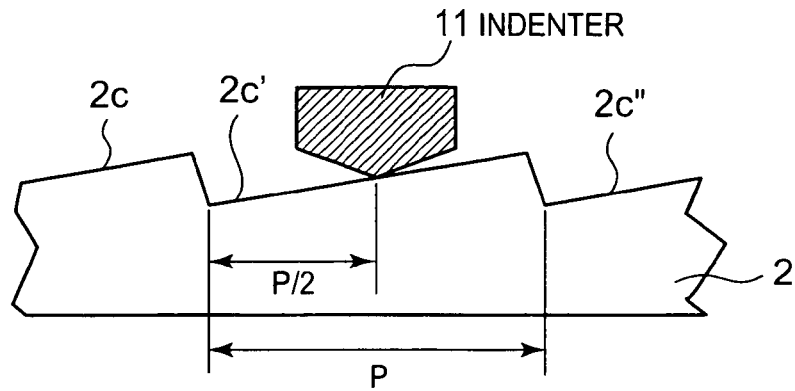
FIG. 4 is a diagram showing a position on which a ball indenter is allowed to act.

As shown in FIG. 4, sites on which the ball indenter is allowed to act are preferably individual subdivided lens faces constituting the Fresnel lens, for example, positions around the center of parts indicated by 2c, 2c', and 2c" in FIG. 4, that is, positions around the center part of the space (pitch width P) between adjacent concave parts on the lens face. Also for other lens shapes, preferably, the ball indenter is allowed to act on positions around the center part of respective individual lens faces constituting the lens.

The compression modulus of elasticity (E) was determined by the following equation.

$$E = 1/(2(hr(2R-hr))^{1/2} \times H \times (\Delta H/\Delta f) - (1-n)/e)$$

wherein hr represents the penetration depth (unit: mm) at an intersection of a tangential line and a penetration depth axis (abscissa) of a curve for the dependency of penetration depth on load in a load reduction section where the load f is the maximum value F;

R represents the radius of the ball indenter (2R=0.4 mm);

H represents the maximum value of penetration depth h (unit: mm);

$\Delta H/\Delta f$ represents the reciprocal of the slope of a load-penetration depth curve in a load reduction section in the case where the load f is the maximum value F;

n represents Poisson's ratio of the material (WC) of the ball indenter (n=0.22); and e represents the modulus of elasticity of the material (WC) of the ball indenter (e=5.3×10$^5$ N/mm$^2$).

As described above, the increase and decrease in load and the like were repeated three times in the order of steps (1) to (4), and, in every time of repetition, a curve for the dependency of penetration depth on load was determined. From each curve, the compression modulus of elasticity (unit:

MPa) was determined, and the average of the values thus obtained was regarded as the compression modulus of elasticity.

4. Calculation of Maximum Deformation Quantity

In the measurement of the compression modulus of elasticity, the deformation quantity of point c in FIG. 3 was regarded as the maximum deformation quantity.

5. Calculation of Elastic Work Ratio

Figure 5:
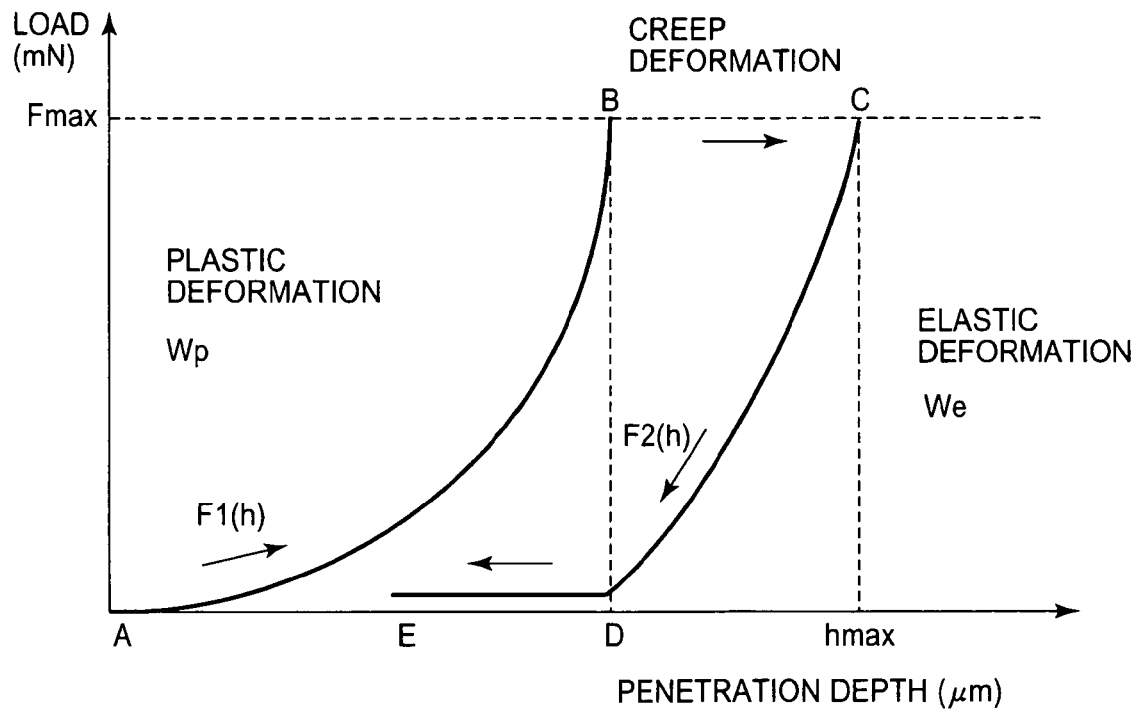
FIG. 5 is a schematic diagram illustrating a curve for the dependency of penetration depth upon load.

FIG. 5 shows the dependency of penetration depth upon load. The elastic work ratio is the ratio of the elastic deformation energy to the total load energy and can be determined from the curve for the dependency of penetration depth upon load shown in FIG. 5. In FIG. 5, when A: initial state, B: at maximum load application, at maximum deformation, B-C: creep deformation quantity, D: after removal of load (to lowest load), D-E: creep deformation quantity at lowest load, E-A: residual deformation amount, and $h_{max}$-E: recovery deformation amount, the elastic deformation ($\eta e$) can be expressed by $$\eta e = W_{elastic}/W_{total}$$

wherein $W_{total} = \int F1(h)dh$; and $W_{elastic} = \int F2(h)dh$.

6. Measurement of Loss Tangent

The sample was formed into a strip having a size of 30 mm×3 mm×0.2 mm, and a load deformation of 0.05% was applied with a dynamic viscoelasticity measuring apparatus ("RHEOVIBRON," manufactured by Orientec Co. Ltd.) for the measurement of storage elastic modulus and loss tangent. In this case, the frequency was 10 Hz, and the temperature was in the range of −100 to 100° C. (temperature rise rate 3° C./min). A curve for the dependency of loss tangent upon temperature was prepared based on measurement results.

Further, the loss tangent at −20° C. was determined from the curve for the dependency of loss tangent upon temperature.

7. Coefficient of Linear Expansion

The coefficient of linear expansion was measured according to ASTM D 696.

8. Water Absorption

The water absorption was measured according to JIS K 7209.

9. Lens Collapse Evaluation Test

The lenticular lens comprising each resin was combined with the test Fresnel lens sheet, and the four sides were fixed with a pressure-sensitive adhesive tape. The assembly was fit into a wooden frame of a television screen size and was mounted on a television set, and visual inspection was carried out with a white screen. One hour after that, when collapse of the Fresnel lens sheet was observed, the lens sheet was evaluated as "x"; when collapse was observed but the collapse level was small, the sheet was evaluated as "○–"; and, when no collapse was observed, the lens sheet was evaluated as "○."

10. Evaluation of Lens Lifting

The lenticular lens comprising each resin was combined with the test Fresnel lens sheet, and the four sides were fixed with a pressure-sensitive adhesive tape. The assembly was fit into a wooden frame of a television screen size to prepare an evaluation test sample. This evaluation test sample was held under an environment of temperature 25° C. and humidity 30% RH for 24 hr, was then held under an environment of temperature 25° C. and humidity 80% RH for 36 hr, and was further held under an environment of temperature 25° C. and humidity 50% RH for 100 hr. Next, the evaluation test sample held for a given period of time was used as a projection screen, and the surface of the lenticular lens in its position around the screen center was evaluated by finger contact. In this case, when the lenticular lens was in intimate contact with the Fresnel and was not in a lifted state, the lenticular lens was evaluated as ○; when the lenticular lens was in a somewhat lifted state, the lenticular lens was evaluated as Δ; and when the lenticular lens was in a completely lifted state, the lenticular lens was evaluated as "x."

11. Evaluation of Friction Resistance of Lens

Figure 6:
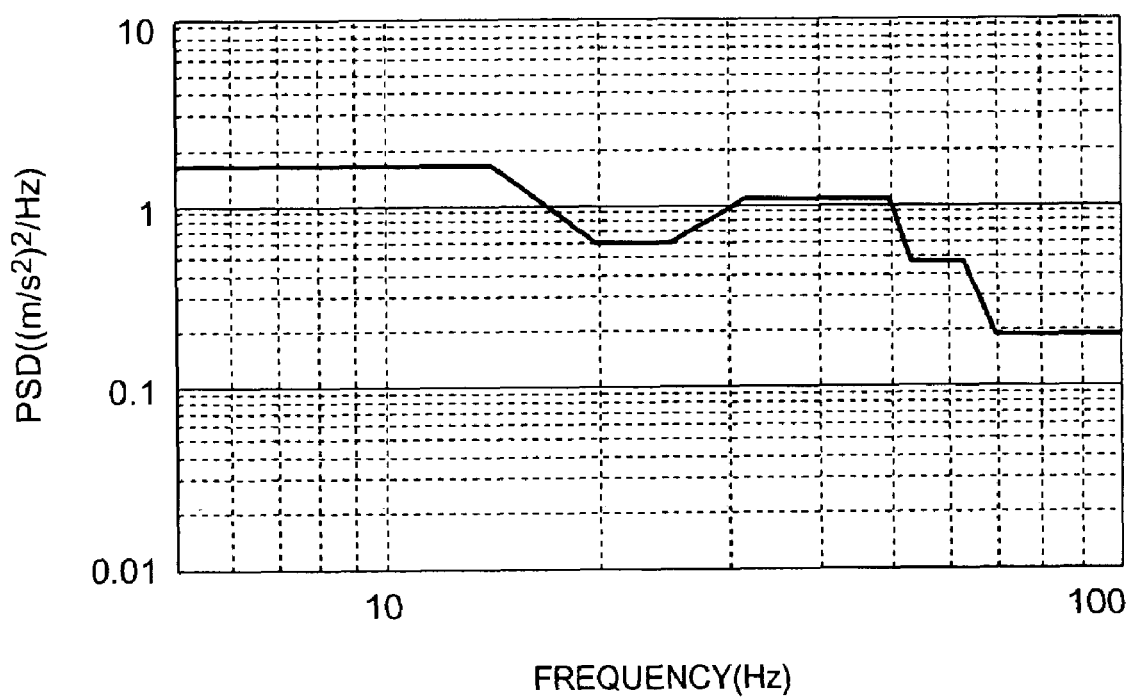
FIG. 6 is a diagram illustrating a PSD waveform showing vibration conditions in a lens friction resistance evaluation test.

The lenticular lens comprising each resin was combined with the test Fresnel lens sheet, and the four sides were fixed with a pressure-sensitive adhesive tape. The assembly was fit into a wooden frame of a television screen size to prepare an evaluation test sample. This evaluation test sample was set in a vibration tester (EDS 252, a vibration tester manufactured by Akashi Corporation) installed in an environmental test room kept at a constant temperature. This test was carried out under vibration conditions of random wave shown in a PSD (power spectrum density) waveform shown in FIG. 6. A vibration test corresponding to 5000 km truck transportation was carried out in such a manner that one cycle consisted of 4320 seconds and the test was carried out by 10 cycles at a temperature of 25° C., by 5 cycles at a temperature of 0° C., and by 3 cycles at a temperature of −20° C.

This random wave is an uncertain wave having statistical properties, and the properties can be expressed in terms of PSD function. In this vibration test, test conditions are determined using this function as a measure. The reason why this random wave is used is that nonlinear elements of vibration can be eliminated, that is, nonlinear elements such as mounting of a projection screen and packaging form can be eliminated to vibrate the vibration of an object under given conditions, and that, since the vibration varies in all parts of the time axis where the test start time was 0 (zero), conditions which are close to the vibration of actual transportation can be created.

After the completion of the test, the evaluation test sample was used as a projection screen, and a wholly white screen was projected. In this case, when uneven luminance caused by friction is clearly observed, the friction resistance was evaluated as x; when uneven luminance was observed but is unnoticeable, the friction resistance was evaluated as Δ; and when uneven luminance was not observed, the friction resistance was evaluated as ○.

The test results and evaluation results are shown in Table 2.

TABLE 2

|  | Universal hardness, N/mm² | Compression modulus of elasticity, MPa | Maximum deformation, μm | tan δ, −20° C. | Elastic work ratio, % | Collapse of lens | Lens friction resistance | Lifting of lens |
|---|---|---|---|---|---|---|---|---|
| Ex. 1 | 38 | 2124 | 2.21 | 0.043 | 79.7 | ○ | ○ | Δ |
| Ex. 2 | 36.2 | 1949 | 2.44 | 0.04 | 81.6 | ○ | ○ | ○ |
| Ex. 3 | 39.3 | 2218 | 2.19 | 0.048 | 83.7 | ○ | ○ | ○ |
| Ex. 4 | 40.9 | 2362 | 2.04 | 0.050 | 77.1 | ○ | ○ | ○ |
| Ex. 5 | 40.7 | 2385 | 2.02 | 0.05 | 81.5 | ○ | Δ | ○ |
| Comp. Ex. 1 | 45.4 | 2747 | 1.75 | 0.045 | 78.2 | ○ | X | ○ |
| Comp. Ex. 2 | 34.0 | 2032 | 2.15 | 0.052 | 69.7 | ○ | ○ | X |
| Comp. Ex. 3 | 42.9 | 2595 | 1.95 | 0.045 | 82.3 | ○ | X | ○ |
| Comp. Ex. 4 | 38.6 | 2121 | 2.42 | 0.053 | 78.5 | ○ | ○ | X |
| Comp. Ex. 5 | 34.9 | 1769 | 2.42 | 0.052 | 78.0 | ○ | ○ | X |
| Comp. Ex. 6 | 31.8 | 1600 | 2.7 | 0.055 | 75.6 | ○ | ○ | X |
| Comp. Ex. 7 | 42.1 | 2505 | 1.89 | 0.042 | 77.4 | ○ | X | ○ |

The invention claimed is:

1. A lens sheet for a screen comprising at least one layer, adapted for use in combination with another lens sheet, wherein the layer in contact with said another lens sheet is formed of a thermoplastic resin, said thermoplastic resin having a universal hardness of 31.0 to 42.0 N/mm², wherein, when the lens sheet for a screen has a single-layer structure, said thermoplastic resin has a water absorption of not more than 0.2%, and when the lens sheet for a screen comprises two or more layers, a relationship represented by $\alpha_1 - \alpha_2 > 0.1\%$ is satisfied, where $\alpha_1$ represents the water absorption % of the thermoplastic resin constituting the layer in contact with said another lens sheet, and α2 represents the water absorption % of the resin constituting the remaining layer(s).

2. The lens sheet for a screen according to claim 1, wherein said thermoplastic resin has a compression modulus of elasticity of 1600 to 2500 MPa and a maximum deformation quantity of 2.0 to 2.7 μm as measured by a creep test.

3. The lens sheet for a screen according to claim 1, wherein said thermoplastic resin has a loss tangent at −20° C. of not less than 0.04 and an elastic work ratio of not less than 70%.

4. The lens sheet for a screen according to claim 1, wherein said thermoplastic resin composition comprises a copolymer of methyl methacrylate, styrene and butadiene rubber, and the content of said methyl methacrylate and styrene is not less than 20% by weight based on said copolymer.

5. Use of a lens sheet for a screen according to claim 1 as a lenticular lens.

6. A projection screen comprising a lenticular lens according to claim 5 and a Fresnel lens.

7. A thermoplastic resin for use in a lens sheet for a screen according to claim 1, said thermoplastic resin having a universal hardness of 31.0 to 43.0 N/mm².

8. A thermoplastic resin according to claim 7, which has a compression modulus of elasticity of 1600 to 2500 MPa and a maximum deformation quantity of 1.95 to 2.7 μm as measured by a creep test.

9. The thermoplastic resin according to claim 7, wherein said thermoplastic resin has a loss tangent at −20° C. of not less than 0.04 and an elastic work ratio of not less than 70%.

* * * * *